United States Patent

[11] 3,554,157

| [72] | Inventors | Richard E. Haughtington<br>Michigan City, Ind.;<br>Earl H. Shipley, Flossmoor, Ill. |
|---|---|---|
| [21] | Appl. No. | 837,438 |
| [22] | Filed | June 30, 1969 |
| [45] | Patented | Jan. 12, 1971 |
| [73] | Assignee | United States Steel Corporation<br>Pittsburgh, Pa.<br>a corporation of Delaware |

[54] TIMER-INDICATOR
8 Claims, 4 Drawing Figs.

[52] U.S. Cl............................................ 116/129,
58/127, 324/60, 356/86
[51] Int. Cl............................................ G09f 9/00
[50] Field of Search.......................................... 116/129,
129C, 129D; 58/126, 127; 73/(Inquired); 356/74,
76, 77, 86, 94; 324/(Inquired)60CD

[56] References Cited
UNITED STATES PATENTS

| 1,433,536 | 10/1922 | Dugit............................ | 116/129UX |
| 1,715,030 | 5/1929 | Gaether........................ | 116/129 |
| 2,544,685 | 3/1951 | Jackson........................ | 324/60UX |
| 3,337,738 | 8/1967 | Price............................ | 356/86 |

*Primary Examiner*—Louis J. Capozi
*Attorney*—Rea C. Helm

ABSTRACT: A timer-indicator for an element concentration spectrometer has a straight indicating hand indexing on a direct reading calibrated spiral for the concentration. A curved second hand is mounted on a shaft concentric with the indicating hand shaft and is geared to move at 95 percent of the travel of the indicating hand. The curvature of the second hand provides continuous indexing of the intersection of the two hands along the spiral indicating the proper place on the spiral for the determined concentration.

PATENTED JAN 12 1971

INVENTORS
RICHARD E. HAUGHTINGTON
& EARL H. SHIPLEY

By Rea C. Helm

Attorney

INVENTORS
RICHARD E. HAUGHTINGTON
& EARL H. SHIPLEY

By Rea C. Helm

Attorney

TIMER-INDICATOR

This invention relates to apparatus for reading a timer-indicator and, more particularly, to improved apparatus for reading a timer-indicator used with a spectrometer for determining the concentration of various chemical elements contained in a sample.

In the manufacture of steel, it is important to rapidly and accurately determine the presence and percent concentration of various chemical elements within iron charged into a furnace. Such determinations may include manganese, phosphorus, sulfur silicon, copper, nickel, chromium, molybdenum and tin. Direct reading spectrometers are the most useful method of determining the alloy presence and concentration in an iron sample. In such apparatus each chemical element is excited to emit a light which includes the characteristic wave lengths apparent in each element. The characteristic wave lengths are received by photomultiplier tubes for each element and converted into electrical energy. The electrical energy is stored on a capacitor and the length of time to discharge the capacitor then becomes a measure of the concentration of that particular element in the iron sample. The discharge time is measured on a timer-indicator.

Timer-indicators usually have a clocklike face with time increments indicated on the circumference. A long hand sweeps the dial during the capacitor discharge indicating the concentration of the particular element in time units. Since the measured time may be more than one revolution of the long hand, a short hand, geared to turn at one-eighth the speed of the long hand, is used to determine the number of long hand revolutions which is shown by the short hand position at the end of the measurement period.

If a timer-indicator operates in the range of up to three revolutions for a measurement period, direct readings in percent concentration of the measured element may be readily available by placing a calibrated spiral on the timer-indicator face. The second hand position will indicate which part of the spiral to read.

When there are a considerable number of rapid determinations to make, the accuracy of the reading is impaired because operators misinterpret the position of the small hand. The operator must look at two hands to determine the reading. When readings become repetitive, the operator may ignore the small hand and read an anticipated value indexed by the long hand which may be in error. The two hands may be in different areas of the clock face which adds to the interpretation problems.

One improvement on the method of reading such a timer-indicator is described in an article entitled "Baird Clock Revisited" by W. R. Kennedy and Robert Norman Smith in the Jul.-Aug. 1968 magazine Applied Spectroscopy, vol. 22, No. 4, pp. 341 and 342. This modification of a timer-indicator is cumbersome because replacing the long hand with a clear circular disc requires considerable modification of the timer-indicator each time a different calibrated spiral is required. In addition, by confining the reference line to the 12:00 position, no allowance is made for face adjustments to compensate for dirty optics or ambient temperature changes. The inertia of such a large disc has an undesirable effect on the resetting of the timer-indicator.

It is therefore an object of my invention to provide a timer-indicator which will directly show the concentration values indexed by both hands on the indicator face.

Another object is to provide such an indicator that does not need interpretation to select a specific point to be read.

Another object is to provide such apparatus that allows convenient and rapid change of calibrating spirals.

These and other objects will become more apparent after referring to the following specification and drawings in which.

Figure 1:
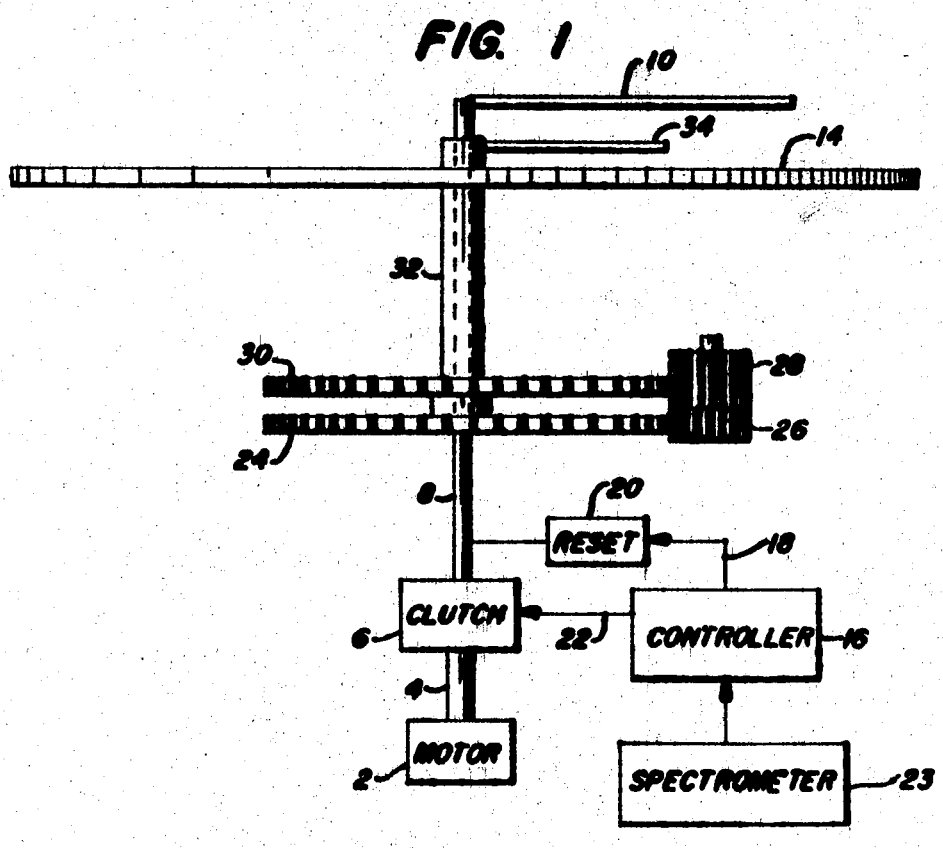
FIG. 1 is a sectional schematic elevational view of a timer-indicator according to our invention.

Referring now to the drawings, reference numeral 2 refers to a synchronous motor having a output shaft 4. An electromagnetic clutch 6 connects output shaft 4 to indicating hand shaft 8. An indicating hand 10 is mounted on the end of shaft 8 to read increments of time 12 on dial 14. A controller 16 provides a reset signal 18 to a reset solenoid 20 which resets indicating hand 10 to 0 and a clutch signal 22 to clutch 6 which connects shaft 4 to shaft 8. The parts thus far described are part of a model BA-S10-C timer-indicator used with a Direct Reader Spectrometer 23 described in Bulletin SC-7, both manufactured by Baird-Atomic, Inc., Cambridge, Mass.

A 72-tooth gear 24 is attached to shaft 8 and drives a 20-tooth pinion 26. Pinion 26 is mounted on a common shaft with a 19-tooth pinion 28. Pinion 28 drives a second 72-tooth gear 30 which is connected to a shaft 32 concentric with shaft 8. A curved hand 34 is attached to the end of shaft 32 to sweep dial face 14. A spiral 36 on dial face 14 has calibrations 38 to indicate element concentration of a specific element.

Figure 2:
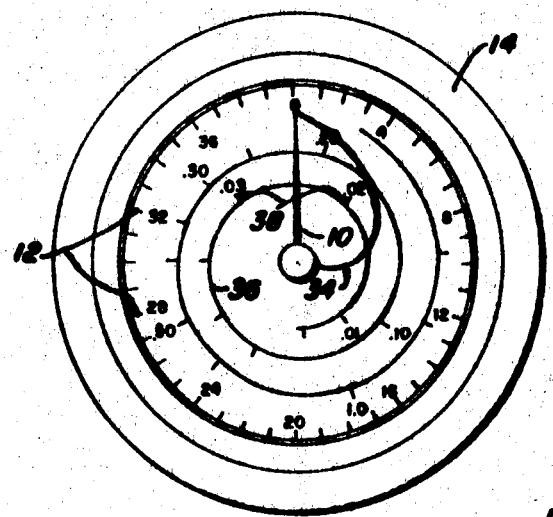
FIG. 2 is a plan view of a timer face showing the hands at the start position.

In operation, the operator places a sample in the spectrometer and actuates the controller. When the spectrometer makes a concentration determination, controller 16 first provides a reset signal 18 which sets indicating hand 10 to the 0 mark as shown in FIG. 2. Curved hand 34 intersects hand 10 at the 0 position where the spiral 36 would be if extended to the 0 position.

Next, the clutch signal 22 to clutch 6 connects shaft 4 to shaft 8 allowing motor 2 to rotate hand 10 in a clockwise direction and hand 34 in a clockwise direction through gears 24, 26, 28 and 30 and shaft 32. The curve of hand 34 is determined from the intersection of hand 10 and spiral 36 as hand 10 rotates. As shown, spiral 36 provides for a maximum of 2-½ revolutions of hand 10.

Figure 3:
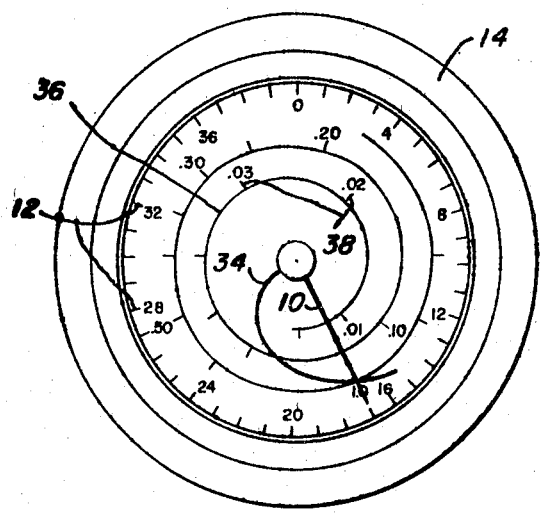
FIG. 3 is a plan view of a timer face showing a reading after about a third of a revolution of the indicating hand.
Figure 4:
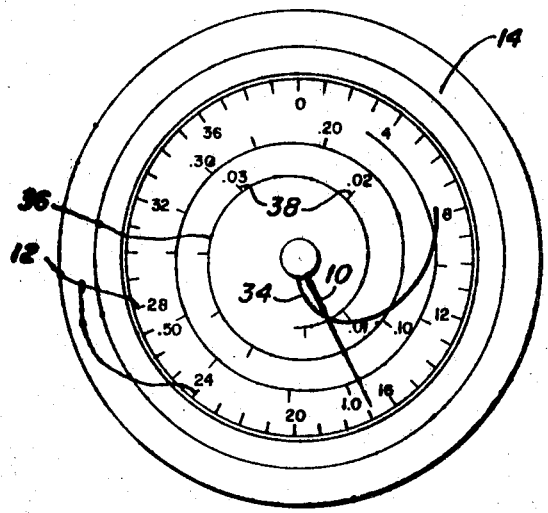
FIG. 4 is a plan view of a timer face showing a reading after about two and one third revolutions of the indicating hand.

When controller 16 times out, signal 22 disengages clutch 6 and hand 10 then stops at the indicated concentration of the element under study. Hand 10 may have moved about one-third of a revolution indicating a reading of 1.00 as shown in FIG. 3 or hand 10 may have moved about 2-⅓ revolutions indicating a reading of about 0.01 as shown in FIG. 4. Hand 34 will always indicate the intersection of hand 10 with the proper part of spiral 36. While a ratio of 19:20 for the travel of hands 34 and 10 has been shown, other ratios, for example, 9:10 may also be used. The 19:20 ratio allows hand 34 to be shorter and therefore easier to read. Readability is also improved by extending hand 34 no longer than the spiral at the 0 mark and by making hand 34 a mark on clear plastic with the mark beginning at the inner end of the spiral.

With this arrangement of hand 34 any calibration of spiral 36 may be used by merely inserting a different calibrated disc into dial face 14, or basic time units may be placed on the spiral. Calibration may be verified against a standard because readings of time increments 12 may be made with a calibrated spiral in place.

With this arrangement, a reading is taken at one location and no interpretation of the position of the second hand 34 is required other than its intersection with hand 10.

While the timer-indicator has been described as used with a spectrometer, it is obvious that the timer-indicator may be used on any operation where it is desired to measure the intervals.

Since it is normally desirable to minimize reset time, hand 34 is made light enough so as not to present an inertia problem.

We claim:

1. In a timer-indicator in which a radial indicating hand is rotated at a constant speed around the center of an indicating dial the length of time to be measured and in which the measured time is determined by the hand indexing on indicated increments of time marked on the circumference of the dial, the improvement comprising a spiral centered on said dial and having a number of revolutions at least as great as the expected revolutions of the indicating hand during a measurement period, a series of calibrations marked on said spiral, a second hand concentrically mounted with said indicating hand, and means to rotate said second hand at a speed slower than said indicating hand when said indicating hand rotates, said second hand having a curvature determined by the intersection of said indicating hand and said spiral progressing from one end of said spiral as said hands are rotated.

2. A timer-indicator according to claim 1 in which the indicating hand and the second hand rotate in the same direction.

3. A timer-indicator according to claim 2 in which the ratio between the speed of the indicating hand and the speed of the second hand is at least as small as 10:9.

4. A timer-indicator according to claim 3 in which said ratio is 20:19.

5. A timer-indicator according to claim 4 in which said calibrations are increments of time.

6. A timer-indicator according to claim 4 in which said time to be measured represents a spectrographically determined element concentration and said calibrations are percent element concentrations.

7. A timer-indicator according to claim 6 in which said second hand has indicating marks from the outermost spiral coverage to the innermost spiral coverage.

8. A timer-indicator according to claim 7 including means to replace one calibrated spiral representing an element concentration by another calibrated spiral representing another element concentration.